United States Patent
Charles

(10) Patent No.: US 9,527,119 B2
(45) Date of Patent: Dec. 27, 2016

(54) SYSTEM FOR DETECTING A POSITION OF A FUME HOOD SASH

(71) Applicant: Siemens Industry, Inc., Alpharetta, GA (US)

(72) Inventor: Donald E. Charles, Wauconda, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 784 days.

(21) Appl. No.: 13/623,753

(22) Filed: Sep. 20, 2012

(65) Prior Publication Data

US 2014/0080396 A1   Mar. 20, 2014

(51) Int. Cl.
| | |
|---|---|
| *B08B 15/02* | (2006.01) |
| *G01B 11/14* | (2006.01) |
| *G06T 7/00* | (2006.01) |
| *G06T 7/60* | (2006.01) |

(52) U.S. Cl.
CPC ........... *B08B 15/023* (2013.01); *G06T 7/0044* (2013.01); *G06T 7/602* (2013.01); *G06T 2207/30108* (2013.01); *G06T 2207/30204* (2013.01)

(58) Field of Classification Search
CPC ...... B08B 15/023; G06T 7/0044; G06T 7/602; G06T 2207/30204; G06T 2207/30108
USPC ..................................................... 454/61, 71
See application file for complete search history.

(56) References Cited

U.S. PATENT DOCUMENTS

| | | | | |
|---|---|---|---|---|
| 5,470,275 | A  * | 11/1995 | Jacob et al. ..................... | 454/61 |
| 6,561,892 | B2 * | 5/2003  | Kolkebeck ....................... | 454/61 |
| 7,122,987 | B2 * | 10/2006 | Chen .............................. | 318/468 |
| 7,990,523 | B2 * | 8/2011  | Schlierbach et al. ........ | 356/5.01 |
| 8,653,962 | B2 * | 2/2014  | Maeng ....................... | 340/539.1 |
| 2005/0024216 | A1 | 2/2005 | Crooks et al. | |
| 2005/0048900 | A1 * | 3/2005 | Scholten ......................... | 454/61 |
| 2009/0160637 | A1 * | 6/2009 | Maeng ....................... | 340/539.1 |

FOREIGN PATENT DOCUMENTS

| | | |
|---|---|---|
| EP | 0541864 A1 | 5/1993 |
| WO | WO 0033983 A1 * | 6/2000 |

OTHER PUBLICATIONS

PCT Search Report for PCT Application No. PCT/US2013/060276 mailed Jan. 14, 2014 (10 pages).

* cited by examiner

*Primary Examiner* — Steven B McAllister
*Assistant Examiner* — Reginald McNeill, II

(57) ABSTRACT

A method for determining a height of a sash opening formed by a movable sash in a fume hood. The method includes providing a laser device on the hood and providing a reflector on the sash. In addition, the method includes positioning the sash in an open position to form the sash opening and measuring a first distance between the laser device and the reflector when the sash is in the open position. The method also includes calculating the sash height based on the first distance.

7 Claims, 7 Drawing Sheets

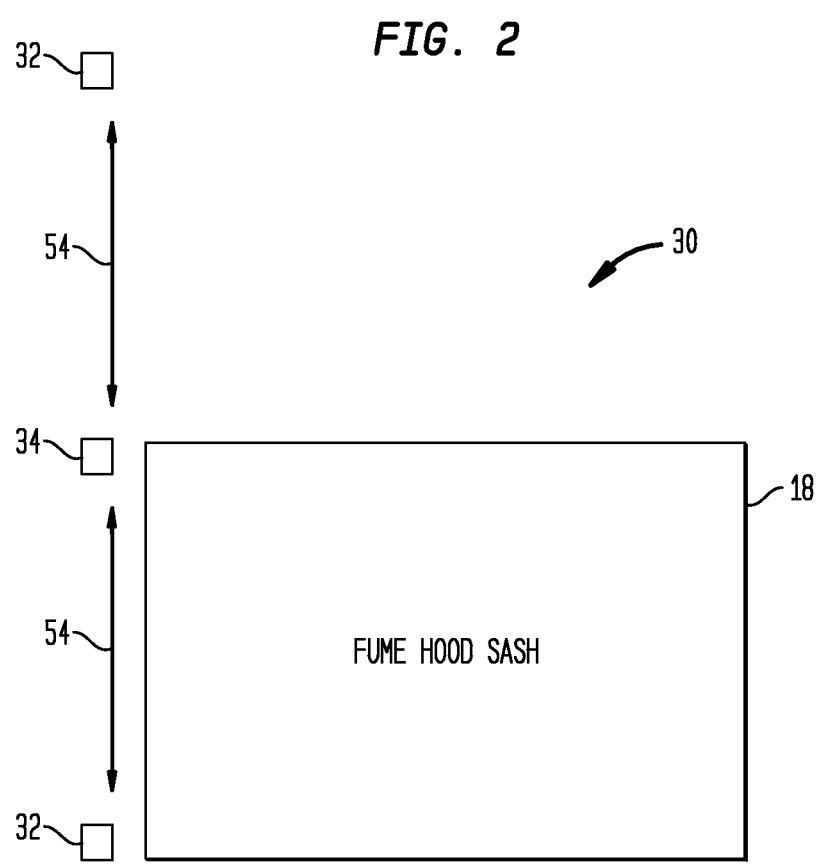

SYSTEM FOR DETECTING A POSITION OF A FUME HOOD SASH

FIELD OF THE INVENTION

This invention relates to fume hoods, and more particularly, to a method for determining a height, an area or size of a sash opening formed by a movable sash in a fume hood.

BACKGROUND OF THE INVENTION

A fume hood is a ventilation device used to minimize exposure to hazardous or noxious fumes, vapors or dust for laboratory workers. Referring to FIG. 1A, a configuration for a fume hood 10 is shown. The fume hood 10 is located in a lab area or room and includes a cabinet structure 12 having a hood opening 14 and a work area 16 located within the fume hood 10. The hood opening 14 may be defined by a cutout in a front side or other side of the cabinet structure 12 having a vertical or longitudinal dimension of "y" and a horizontal or latitudinal dimension of "x", or sash width x, as shown in FIG. 1A. A movable, transparent sash 18 is used to open or close the hood opening 14. In one embodiment, the sash 18 moves in a vertical direction such that the sash 18 is spaced above an edge 19 of the work area 16 to form a sash opening 20 (as portion of hood opening 14) having a sash height 17 (within the range of 0 to "y") for providing access to the work area 16. The fume hood 10 is connected to an exhaust fan and damper arrangement by ductwork (not shown in FIG. 1A or 1B). The exhaust fan serves to draw air from the room through the sash opening 20, work area 16, ductwork and the damper. The air is then vented outside of the building by the exhaust fan thus removing fumes, vapors or dust. In an alternate embodiment (see FIG. 1B), the fume hood 10 includes a sash 22 that moves either vertically or horizontally relative to the hoop opening 14 to form a sash opening 24.

It is desirable to maintain the speed of the air (i.e. the face velocity) drawn through the fume hood 10 within a desired air speed range. If the face velocity is too low, there may be insufficient venting of the work area 16. If the face velocity is too high, undesirable air turbulence is generated which may cause movement of the contaminants into a worker's breathing zone. An acceptable range for face velocity may vary between approximately 80-120 feet per minute (fpm) depending on the type of hood and hazard. The face velocity may be determined based on an area or size of the sash opening 20 and a pressure drop value across the sash 18 measured by pressure sensors.

In order to maintain the face velocity within the desired range, the speed of the exhaust fan and/or associated damper must be adjusted to take into account the current size of the sash opening 20. In particular, the speed of the exhaust fan is increased or a damper opening is increased as the size of the sash opening 20 is increased. Conversely, the speed of the exhaust fan is decreased or the damper opening is decreased as the size of the sash opening 20 is decreased. Similarly, the speed of the exhaust fan and/or associated damper must be adjusted to take into account the size of the sash opening 24 for the configuration shown in FIG. 1B.

Therefore, it is desirable that the size of a sash opening be accurately and reliably obtained so that the speed of the exhaust fan and the damper are properly adjusted and the face velocity is kept within the desired range.

SUMMARY OF THE INVENTION

A method for determining a height of a sash opening formed by a movable sash in a fume hood is disclosed. The method includes providing a laser device on the hood and providing a reflector on the sash relative to a light emitting axis of the laser device. In addition, the method includes positioning the sash in an open position to form a sash opening and measuring a first distance between the laser device and the reflector when the sash is in the open position. The method further includes using a lab room controller to adjust a speed of the exhaust fan or an opening of a damper based on the determined sash height to maintain the face velocity within a predetermined range.

BRIEF DESCRIPTION OF THE DRAWINGS

FIG. 2 is an illustrative diagram for a system for detecting a position of a sash in accordance with the present invention.

DESCRIPTION OF THE INVENTION

Figure 1A:
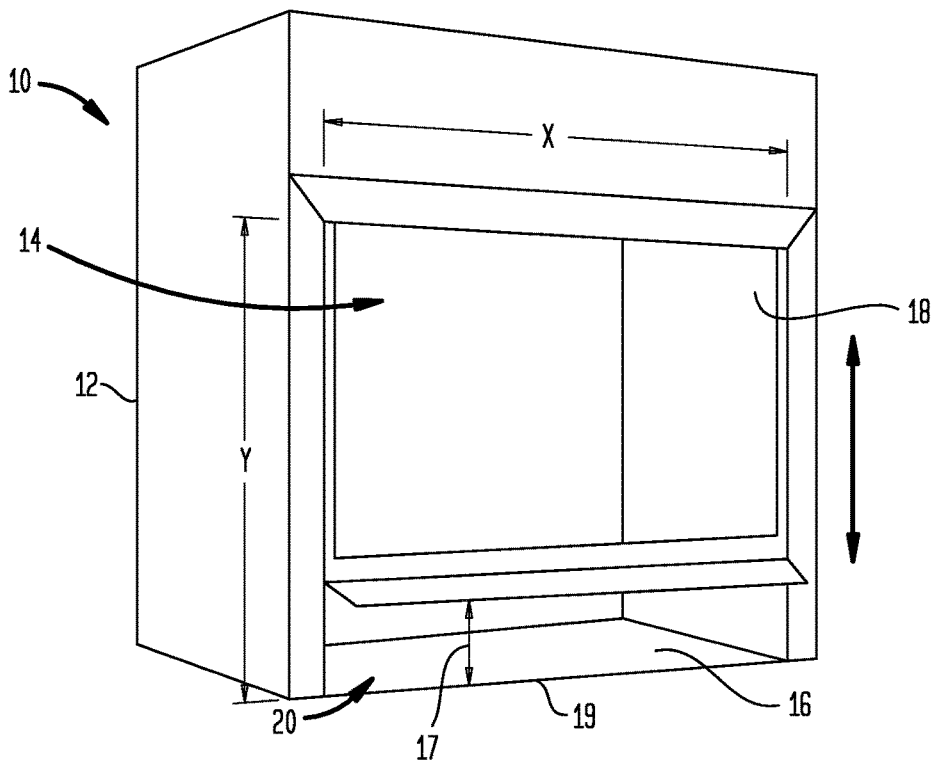
FIGS. 1A and 1B depict configurations for a fume hood.
Figure 1B:
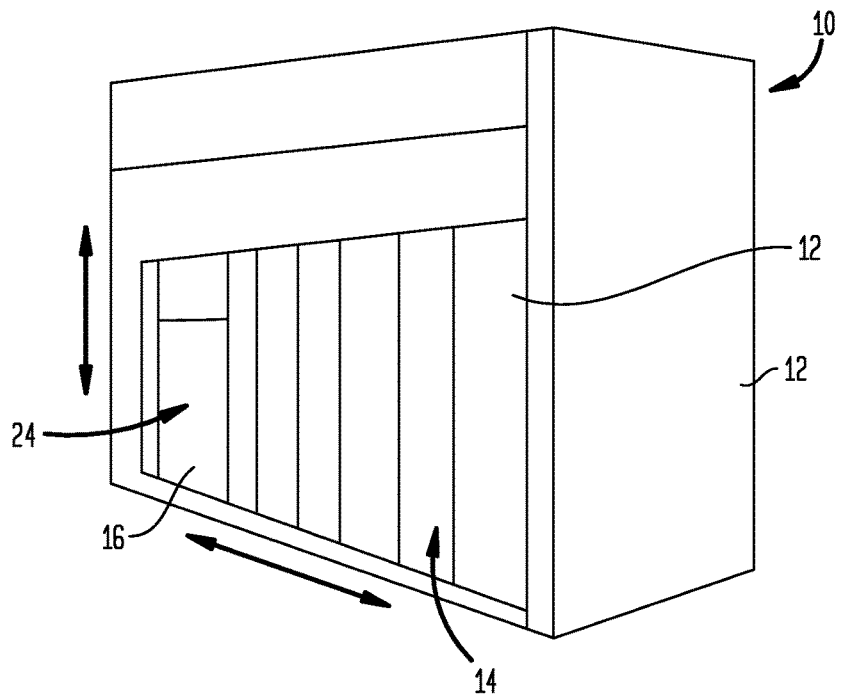

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. In the description below, like reference numerals and labels are used to describe the same, similar or corresponding parts in the several views of FIGS. 1-7.

Referring to FIG. 2, an illustrative diagram for a system 30 for detecting a position of the sash 18 is shown. The system 30 includes a distance measuring device, such as a laser device 32, and a laser light reflector or target element 34 affixed to sash 18. The laser device 32 emits laser light which impinges on the target element 34. The laser light is then reflected back to the laser device 32 whereupon a distance 54 between the laser device 32 and the target element 34 is determined or identified. In one embodiment the laser device 32 is located above the target element 34. In an alternate embodiment, the laser device 32 is located below the target element 34.

Figure 3:
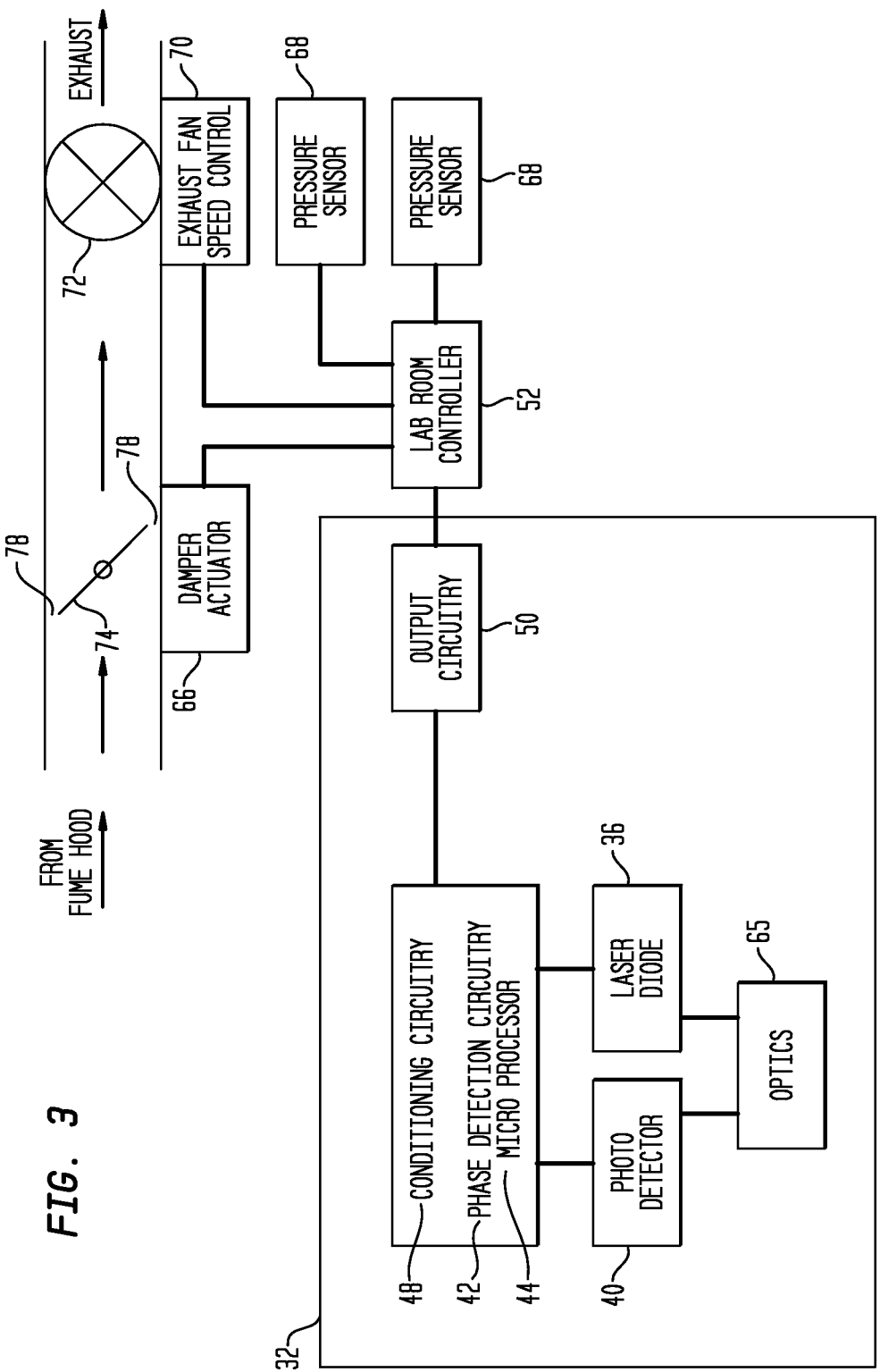
FIG. 3 is a block diagram for an exemplary laser device that may be employed in the system of FIG. 2.

Referring to FIG. 3 in conjunction with FIG. 2, an internal functional block diagram for the laser device 32 is shown. The laser device 32 includes a laser diode 36 for generating laser light of a predetermined frequency that is transmitted through optics 38 to the target element 34. Light reflected from the target element 34 is then transmitted back through the optics 38 and detected by a photo detector 40. In one embodiment, the laser device 32 includes phase detection circuitry 42 that compares the phase shift of reflected laser light detected by the photo detector 40 to that of the laser light emitted by the laser diode 36 to determine the distance 54 between the laser device 32 and the target element 34 by a microprocessor 44. The distance 54 between the laser device 32 and the target element 34 is then determined by the microprocessor 44 using a known calculation technique. The laser device 32 further includes conditioning circuitry 48 for reducing or optimizing signal noise. Output circuitry 50 is operably connected to the microprocessor 44 and configured to provide an output signal having a characteristic such as voltage, current or resistance values indicative of the distance 54 determined by the microprocessor 44. The output signal is provided via output circuitry 50 to a lab room controller 52. The controller 52 is operably connected to differential pressure sensors 68 and serves to control a damper actuator 66 or an exhaust fan speed control 70 as will be described. Alternatively, the output may be communicated over a bus between the output circuitry 50, microprocessor 44 and controller 52. The output circuitry 50 may be configured to interface with existing controllers depending on the input requirements of the controller. In an alternate embodiment, the laser device 32 may be configured to communicate wirelessly with the controller 52. The configuration of the laser device 32 may be similar to that of commercially available laser distance meters without the need for a display that is used in such meters. One type of laser distance meter is the Fluke 411D Laser Distance Meter supplied by Fluke Corporation.

Figure 4:
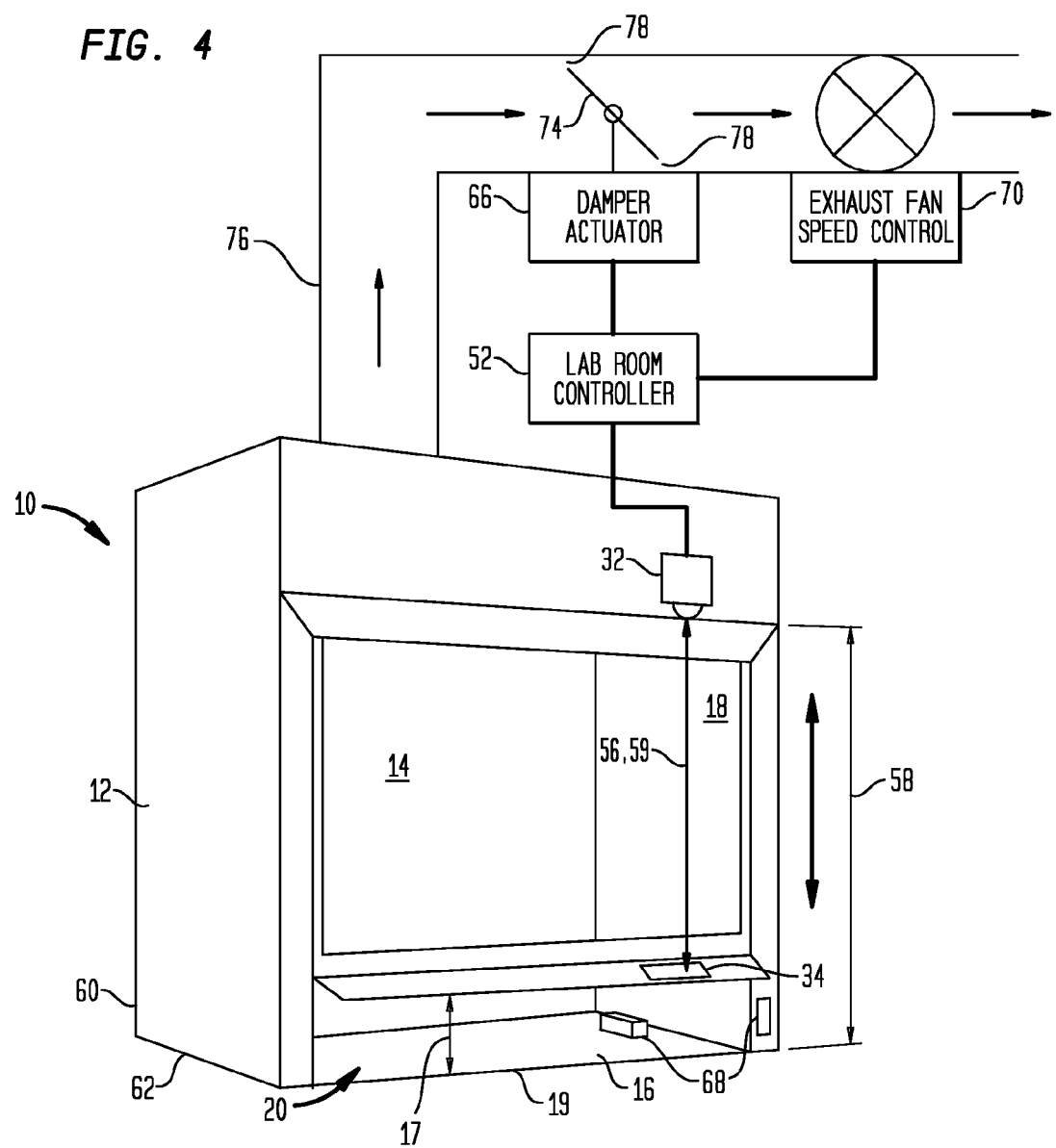
FIG. 4 depicts the laser device attached to an upper portion of the hood shown in FIG. 1A in accordance with one embodiment of the present invention.

Referring to FIG. 4, a configuration for the laser device 32 is shown attached to an upper portion of the fume hood 10 previously described in relation to FIG. 1A. The sash 18 includes a frame 60 having an outwardly extending ledge portion 62. In the embodiment shown in FIG. 4, the target element 34 is affixed to the ledge portion 62 and thus moves vertically in unison with the sash 18. In a first position, the sash 18 is spaced above the edge 19 of the work area 16 to form the sash opening 20 having the sash height 17 for providing access to the work area 16. The laser device 32 is oriented relative to the sash 18 such that laser light emitted by the laser device 32 impinges on the target element 34. The laser light is then reflected back to the laser device 32 whereupon a first distance 56 between the laser device 32 and the target element 34 is determined by the microprocessor 44 alone or in combination with the phase detection circuitry 42 and/or the conditioning circuitry 48 as previously described in relation to FIG. 3.

Figure 5:
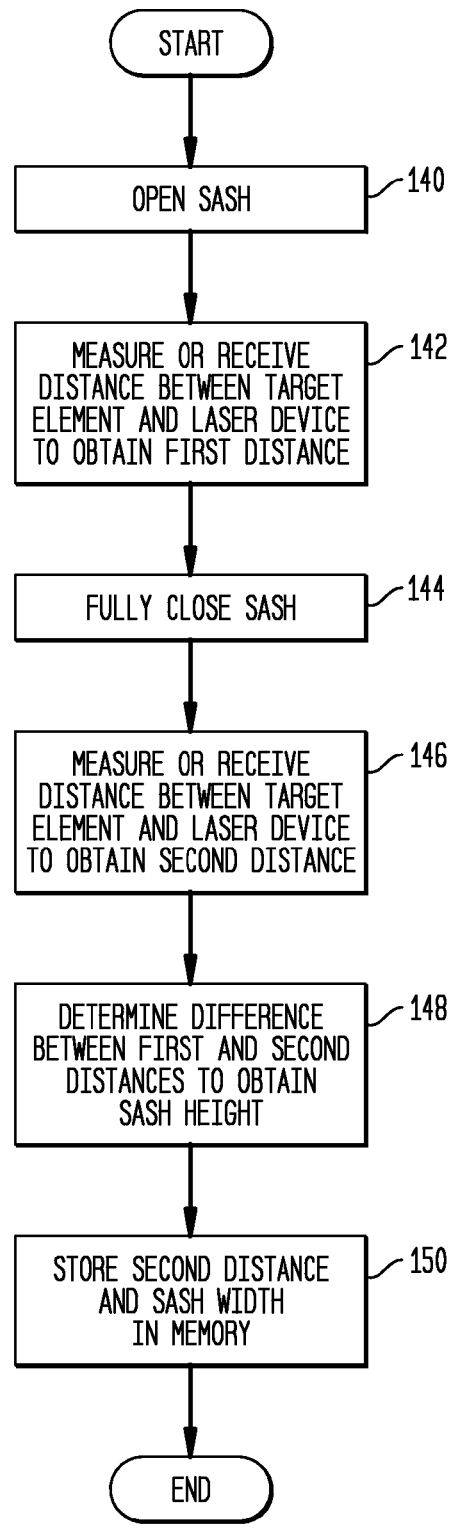
FIG. 5 depicts a process for calibrating the system.

Referring to FIG. 5 in conjunction with FIG. 4, a process 138 for calibrating the system 30 is shown. The system 30 may be calibrated by first opening the sash 18 at step 140. In step 142, the distance between the laser device 32 and the target element 34 is then determined or received to obtain the first distance 56 corresponding to when the sash 18 is open as described above. In step 144, the sash 18 is closed, thus locating the target element 34 in a second position corresponding to a closed sash 18. In step 146, a second distance 58 between the laser device 32 and the target element 34 when the target element 34 is in the second position is determined by the microprocessor 44 alone or in combination with the phase detection circuitry 42 and/or the conditioning circuitry 48. In step 148, a dimension of the sash height 17 of the sash opening 20 is then derived by the microprocessor 44 alone or in combination with the phase detection circuitry 42 and/or the conditioning circuitry 48 by determining the difference between the first 56 and second 58 distances. In step 150, the second distance 58 is then stored in memory 92 (see FIG. 6), along with the sash width x, for subsequent determination of an area of the sash opening 20.

In an alternate embodiment, the laser device 32 is attached underneath the ledge portion 62 and the target element 34 is attached on an underside of the ledge portion 62. This arrangement enables direct measurement of the sash height 17 by the laser device 32. In yet another embodiment, the laser device 32 is attached to the sash 18 and the target element 34 is attached to the fume hood 10 above or below the hood opening 14. The target element 34 may also be attached to other items which move in conjunction with the sash 18, such as portions of a counterbalance system used for facilitating opening and closing of the sash 18. In such systems, a cable and pulley arrangement is utilized wherein a first end of a steel cable, for example, is attached to the sash and is guided by pulleys to a counterweight wherein a second end of the cable is attached to the counterweight. Both the cable and counterweight move in conjunction with the opening and closing of the sash 18. In this embodiment, the target element 34 may be attached to either the cable or the counterweight. The laser device 32 is positioned such that laser light emitted by the laser device 32 impinges on the target element 34. The current invention may also be utilized with a fume hood 10 having a sash that moves horizontally such as that described in relation to FIG. 1B.

As previously described, it is desirable to maintain the face velocity of the air being drawn through the fume hood 10 within a desired air speed range. If the face velocity is too low, there may be insufficient venting of the work area 16. If the face velocity is too high, undesirable air turbulence is generated which may cause movement of the contaminants into a worker's breathing zone.

The controller 52 receives measurements from the pressure sensors 68 which measure a pressure drop across the sash 18. It is noted that the pressure sensors 68 may be positioned in locations other than those depicted in FIG. 4 that are suitable for determining a pressure drop across the sash 18. The face velocity is then determined based on an area or size of the sash opening 20 and the pressure drop value. In order to maintain the face velocity within the desired range, the speed of an exhaust fan 72 and/or associated damper 74 located in ductwork 76 is then adjusted to take into account the sash height 17 and thus the size of the sash opening 20. In particular, the speed of the exhaust fan 72 is increased or a damper opening 78 is increased by the controller 52 via the damper actuator 66 or speed control 70, respectively, as the size of the sash opening 20 is increased. Conversely, the speed of the exhaust fan 72 is decreased or the damper opening 78 is decreased by the controller 52 via the damper actuator 66 or speed control 70, respectively, as the size of the sash opening 20 is decreased. The controller 52 may be adapted to automatically control adjustment of the exhaust fan speed/and or damper based on the calculated height of the sash opening 20 in order to maintain the face velocity within a desired speed range. For example, the speed range may be approximately 80-120 feet per minute (fpm). Alternatively, the sash height 17 may be automatically adjusted through the use of motors and other drive elements so as to maintain the face velocity within the desired speed range while keeping the fan speed and/or damper position constant.

Figure 6:
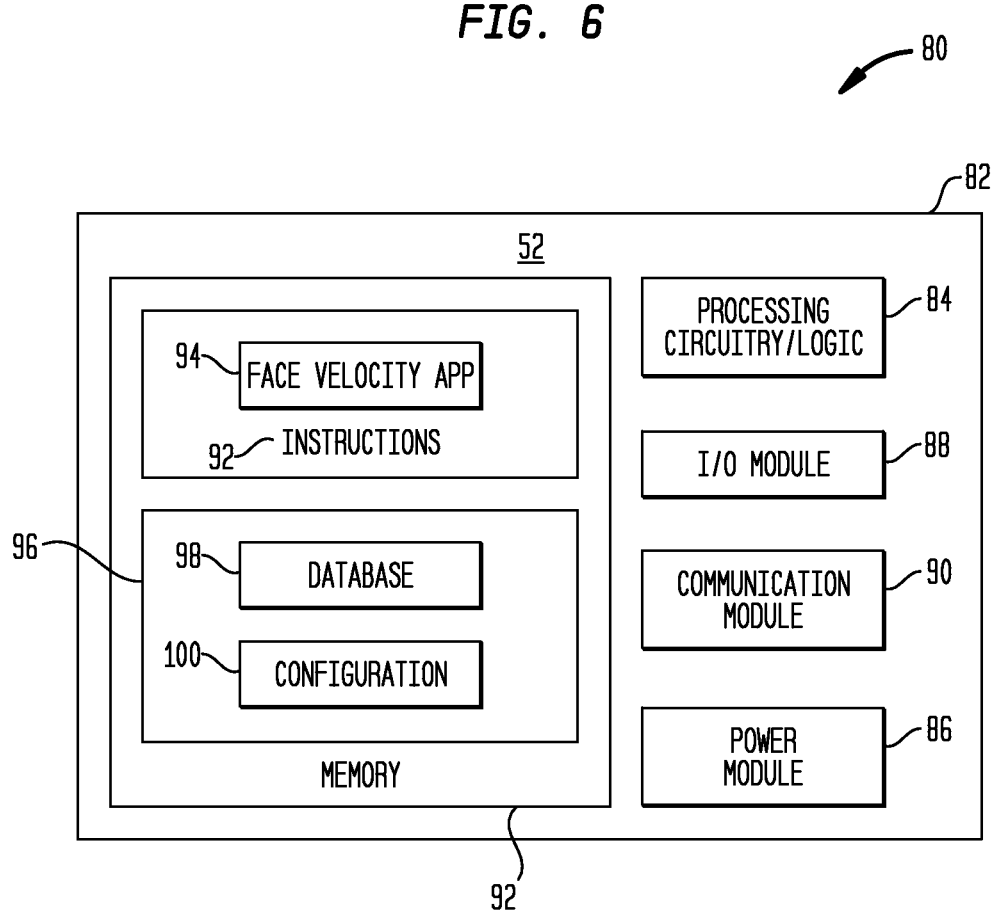
FIG. 6 depicts a block diagram of a lab room controller that may be employed in the system of FIG. 2 in accordance with the present invention.

Referring to FIG. 6, a block diagram 80 for the controller 52 is shown. The controller includes a housing, cabinet or the like 82 that is configured in a typical manner for a building automation system application. The controller 52 includes processing circuitry/logic 84, a power module 86, an I/O module 88, a floor level network ("FLN") network communications module 90, and a memory 92.

The processing circuitry/logic 82 is operative, configured and/or adapted to operate the controller 52 including the features, functionality, characteristics and/or the like as described herein. To this end, the processing circuit/logic 82 is operably connected to all of the elements of the controller 52 described below. The processing circuitry/logic 82 executes or is under the control of program instructions or programming software or firmware 92 contained in memory 92, such as face velocity application 94. The face velocity application 94 is configured to control and process data from field devices such as pressure sensors 68, damper actuator 66 and speed control 70. In addition to storing the instructions 92, the memory 92 also stores data 96 such as, for example, historical pressure sensor data stored in a database 98, configuration files 100, or data stored in various other formats.

Execution of the face velocity application 94 by the processing circuit/logic 82 results in control signals being sent to the damper actuator 66 and speed control 70 via the I/O module 88 of the controller 52. Execution of the face velocity application 174 also results in the processing circuit/logic 82 receiving status signals and other data signals from the pressure sensors 68, damper actuator 66 and speed control 70. Data from the pressure sensors 68, damper actuator 66 and speed control 70 and other field devices may be stored in the memory 92.

The power module 86 is operative, adapted and/or configured to supply appropriate electricity to the various components of the controller 52. The power module 86 may operate on standard 120 volt AC electricity, but may alternatively operate on other AC voltages or include DC power supplied by a battery or batteries.

The I/O module 88 includes one or more input/output circuits that communicate directly with the pressure sensors 68, damper actuator 66 and speed control 70. Thus, for example, the I/O module 88 includes analog input circuitry for receiving analog sensor signals from the pressure sensors 68, and includes analog output circuitry for providing analog actuator signals to the damper actuator 66.

Further, the network communication module 90 allows for communication to a field panel and other components on a FLN, for example.

Figure 7:
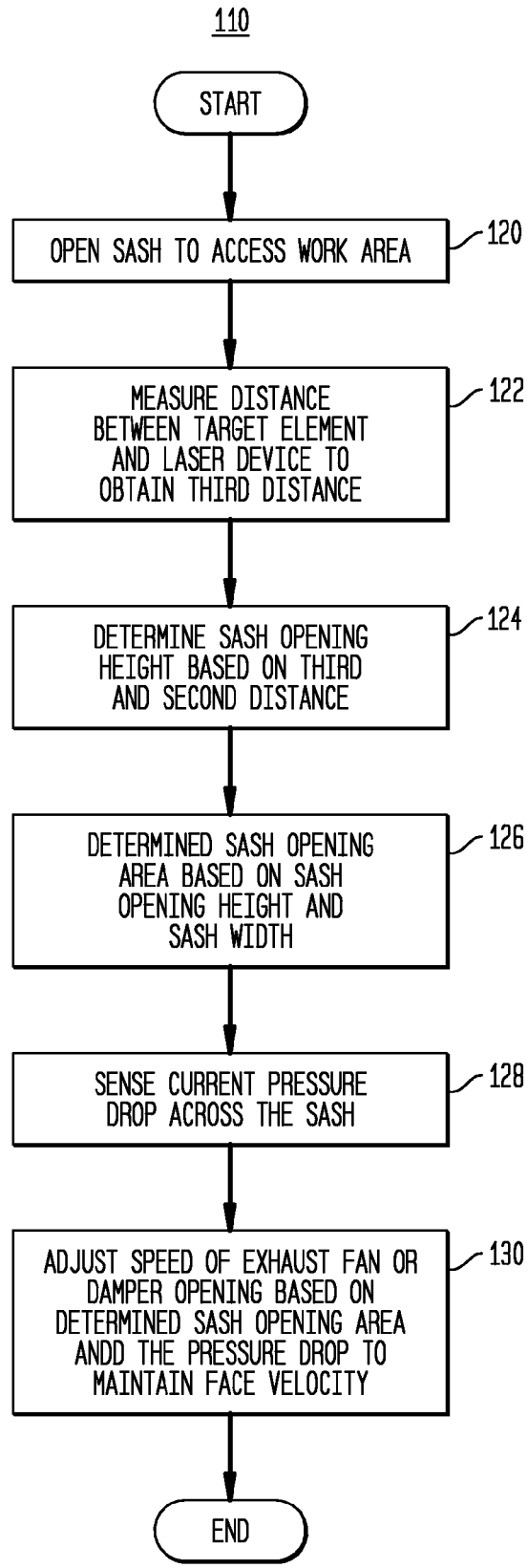
FIG. 7 depicts an exemplary process for operating the system to generate a current face velocity based on a received measurement from the laser device.

Referring to FIG. 7, a process 110 for operating the system 30 is shown. The process 110 is used after the system 30 has been calibrated as previously described in relation to FIG. 5. During use, the sash 18 is opened to a height suitable for accessing the work area 16 (see FIG. 1) in step 120. When this occurs, a third distance 59 between the laser device 32 and the target element 34 is determined by the microprocessor 44 alone or in combination with the phase detection circuitry 42 and/or the conditioning circuitry 48 in step 122. At step 124, a sash opening height is determined based on the third distance 59 and the second distance 58 stored in memory 92. Further, a sash opening area is determined at step 126 based on the sash opening height and the sash width x stored in memory 92. At step 128, a pressure drop across the sash 18 is sensed. At step 130, a speed of the exhaust fan 72 or an opening of a damper 78 is adjusted based on the determined sash opening area and the pressure drop to maintain the face velocity within a predetermined range.

Conventional systems utilize conductive stripes that are located in a track that enables movement of the sash. The sash includes a ball bearing that serves as a contact which shorts the conductive stripes together. A resistance is then measured between the stripes to give an indication of the sash height. The system 30 provides improved reliability and accuracy with measurement of the sash height 17 as compared to conventional systems.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations.

What is claimed is:

1. A method for determining a height of a sash opening formed by a movable sash relative to an edge defining one end of a cutout in a fume hood, wherein air flowing through the sash opening has a face velocity, comprising:
   providing a laser device located on the hood to provide unobstructed access to a work area that forms the sash opening;
   providing a target element on the sash in line with a light emitting axis of the laser device;
   positioning the sash in a closed position wherein when the sash is in the closed position the target element is moved to a corresponding position indicating that the sash is closed;
   measuring a first distance between the laser device and the target element when the sash is in the closed position;
   positioning the sash in an open position to form the sash opening wherein when the sash is in the open position the target element is moved to a corresponding position indicating that the sash is opened;
   measuring a second distance between the laser device and the target element when the sash is in the open position; and
   determining the sash height based on a difference between the first and second distances wherein the determined sash height is used to adjust air flow to maintain the face velocity within a desired range.

2. The method according to claim 1 wherein the laser device measures distance based on a comparison of a phase shift between reflected laser light detected by the laser device and laser light emitted by the laser device.

3. The method according to claim 1 wherein the laser device communicates with a lab room controller.

4. The method according to claim 1 wherein the sash includes a frame and the target element is attached to a ledge of the frame.

5. The method according to claim 1 wherein the sash moves vertically relative to the cutout in the fume hood to form the sash height.

6. The method according to claim 1 wherein the laser device is mounted to an upper portion of the hood above a top end of the cutout in the fume hood and the target element is attached to a top side of a ledge of the frame.

7. The method according to claim 1 wherein the laser device is mounted to a lower portion of the hood near the one end of the cutout and the target element is attached to a bottom side of a ledge of the frame.

* * * * *